United States Patent
Rommel et al.

(10) Patent No.: US 11,489,436 B2
(45) Date of Patent: Nov. 1, 2022

(54) SYSTEM AND APPARATUS TO PROVIDE CURRENT COMPENSATION

(71) Applicant: Texas Instruments Incorporated, Dallas, TX (US)

(72) Inventors: Markus Georg Rommel, Freising (DE); Konrad Wagensohner, Mauern (DE); Rebecca Grancaric, Freising (DE); Michael Uwe Schlenker, Marzling (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 550 days.

(21) Appl. No.: 16/579,420

(22) Filed: Sep. 23, 2019

(65) Prior Publication Data

US 2020/0091813 A1 Mar. 19, 2020

Related U.S. Application Data

(63) Continuation of application No. 16/129,707, filed on Sep. 12, 2018, now Pat. No. 10,461,629.

(60) Provisional application No. 62/632,255, filed on Feb. 19, 2018.

(51) Int. Cl.
*H02M 1/088* (2006.01)
*H02M 3/158* (2006.01)
*H02M 1/00* (2006.01)

(52) U.S. Cl.
CPC ............ *H02M 1/088* (2013.01); *H02M 1/00* (2013.01); *H02M 3/158* (2013.01); *H02M 1/0009* (2021.05); *H02M 1/0048* (2021.05)

(58) Field of Classification Search
CPC ...... H02M 1/088; H02M 1/00; H02M 1/0009; H02M 1/0048; H02M 3/158; H02M 3/156; Y02B 70/10
See application file for complete search history.

(56) References Cited

U.S. PATENT DOCUMENTS

| | | | |
|---|---|---|---|
| 4,763,028 A | 8/1988 | Henry | |
| 8,742,823 B2 | 6/2014 | Seth et al. | |
| 9,748,842 B1* | 8/2017 | Devarajan | H02M 1/08 |
| 9,791,480 B2* | 10/2017 | Qin | G01R 19/0092 |
| 2015/0381032 A1 | 12/2015 | Li et al. | |

FOREIGN PATENT DOCUMENTS

EP 1841052 A2 * 10/2007 ......... H03K 17/0822

* cited by examiner

*Primary Examiner* — Thienvu V Tran
*Assistant Examiner* — Shahzeb K Ahmad
(74) *Attorney, Agent, or Firm* — Ray A. King; Charles A. Brill; Frank D. Cimino (57) ABSTRACT

Apparatus and systems and articles of manufacture are disclosed to provide adaptive leakage compensation for powertrains. An example apparatus comprising a first current path including a first transistor and a second transistor; a second current path including a third transistor and a fourth transistor; and a current mirror including a fifth transistor and a sixth transistor, wherein a first ratio exists between the first transistor and the third transistor, a second ratio exists between the second transistor and the fourth transistor, and a third ratio exists between the fifth transistor and the sixth transistor, the third ratio greater than or equal to the second ratio, the second ratio greater than or equal to the first ratio.

19 Claims, 5 Drawing Sheets

FIG. 8

SYSTEM AND APPARATUS TO PROVIDE CURRENT COMPENSATION

RELATED APPLICATIONS

Under 35 U.S.C. §§ 119(e) and 120, this continuation application claims the benefits of priority from U.S. Non-provisional patent application Ser. No. 16/129,707, filed on Sep. 12, 2018, which claims the benefits of priority from U.S. Provisional Pat. Appl. No. 62/632,255, filed on Feb. 19, 2018. The above referenced applications are hereby incorporated herein by reference in their entirety.

FIELD OF THE DISCLOSURE

This disclosure relates generally to power converters and, more particularly, to methods and apparatus to provide current compensation.

BACKGROUND

A power converter is a circuit that converts an input voltage to a desired output voltage. One type of power converter is a switched-mode power supply in which switches are used to convert the input voltage to the desired output voltage. Switched-mode power supplies may convert alternating current (AC) voltage to direct current (DC) voltage or convert DC voltage of one level to DC voltage of another level. For example, a buck converter converts an input DC voltage into a lower, desired output DC voltage by controlling transistors and/or switches to charge and/or discharge inductors and/or capacitors to maintain the desired output DC voltage.

SUMMARY

Certain examples disclosed herein increase efficiency of power converters by removing leakage current from the output of the power converter for low quiescent current applications. An example apparatus includes a first current path including a first transistor that includes a first gate, a first drain and a first source, and a second transistor that includes a second gate, a second drain and a second source, the first drain coupled to the second drain; a second current path including a third transistor that includes a third gate, a third drain, and a third source, and a fourth transistor that includes a fourth gate a fourth drain and a fourth source, the third source coupled to the first source and the third gate, the third drain coupled to the fourth drain, the fourth source coupled to the fourth gate and the second source; and a current mirror including a fifth transistor that includes a fifth gate, a fifth drain, and a fifth source, and a sixth transistor that includes a sixth gate, a sixth drain, and a sixth source, the fifth drain coupled to the third drain, the sixth gate and the fifth gate, the sixth drain coupled to the second drain, the fifth source coupled to the sixth source and the fourth source, wherein a first ratio exists between the first transistor and the third transistor, a second ratio exists between the second transistor and the fourth transistor, and a third ratio exists between the fifth transistor and the sixth transistor, the third ratio greater than or equal to the second ratio, the second ratio greater than or equal to the first ratio.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Power converters (e.g., buck converters, boost converters, AC-AC converters, DC-DC converters, AC-DC converters, etc.) may include power switches (e.g., relays, diodes, etc.) that switch currents from one path to another. Such switches may be solid state in nature and thus not cause a physical disconnect between the multiple paths for current to flow. In some cases, small levels of leakage current (i.e., current that flows when the ideal current is zero) can flow through the switches and into an unintended path. In high power, ultra-low quiescent current applications, as the ambient temperature rises around the switch, the leakage current will increase. An increase in leakage current can lead to a voltage runaway at an output of a power converter, which can cause malfunction of connected circuits. To combat a rise in leakage current over temperature, a compensation circuit may be added to power converters to draw the leakage current from the output. Traditionally, a compensation circuit is based on a worst-case leakage current that is drawn or subtracted from the output. Another common compensation circuit will draw either the high-side leakage current or the low-side leakage current from the output. Another compensation circuit will mirror the leakage current directly from the sensing apparatus to output voltage.

Leakage current can occur when electronic devices are attached to a charged source such that the source slowly discharges due to non-ideal characteristics of the electronic devices. Typically, leakage current occurs because the electronic devices (e.g. transistors, diodes, etc.) that are connected to the charged source conduct small amounts of current when the electronic device are intended to be off. When devices are in low quiescent current applications, the devices are idle for an extended period of time. The leakage currents are generally on the scale of microamps while the current through devices in power converter applications when not in idle state is on the scale of tens to hundreds of amps.

Leakage currents occur in semiconductors due to mobile charge carriers tunneling through insulating regions. For example, mobile charge carriers can tunnel between junctions of differently doped semiconductors (e.g. P-type, N-type). Leakage current in metal oxide semiconductor field effect transistors (MOSFETs) can occur from source to drain and allow for current to flow in the intended conduction path when the device is to be off and sourcing no current. Leakage current increases the power consumption of a device regardless of the ambient temperature and if it increases without bound, it can cause the device serious malfunctions.

In switched-mode power supplies, a set of synchronous switches may be used to increase the efficiency of the power supplies. The set of synchronous switches may be two switches that operate such that when a high-side switch (e.g. transistor) is on, a low-side switch (e.g. transistor) is off, and when the high-side switch is off, the low-side switch is on. An example implementation of synchronous switches may be a high-side transistor that is a PMOS transistor and a low-side transistor that is an NMOS transistor. In this example implementation, the high-side PMOS transistor has a wider channel than the low-side NMOS transistor. The larger width of the channel of the PMOS transistor is due to the lower mobility of the carriers in PMOS transistors than in NMOS transistors. The larger width of the channel allows for similar switching speeds for turning on and off between the PMOS transistor and the NMOS transistor. However, due to the larger width of the channel, the high-side PMOS transistor typically has a larger leakage current than the low-side NMOS transistor. This will cause the net of high-side leakage current and low-side leakage current to flow to the output of the switched mode power supply. Different implementations of a set of synchronous switches may use PMOS transistors, NMOS transistors, bipolar junction transistors (BJTs), junction gate field effect transistors (JFETs), diodes, etc., or any combination thereof.

A more adaptive, encompassing, and complete solution to the rise in leakage current over temperature is to actively sense the leakage current in the set of synchronous switches, determine the difference between the leakage currents, and only remove that difference from the output of the power converter. As described herein, current may be drawn off the output when the high-side transistor has a larger leakage current than the low-side transistor. Additionally, this solution is adaptive and may remove the excess leakage current in the output of the power converter across any ambient temperature of the power converter. The total amount of power dissipated by the leakage current ($P_{D_{Total(Leakage)}}$) that flows through the high-side transistor and the low-side transistor may impact the efficiency of the power converter in which the transistors are used as seen below:

$$\eta(\text{efficiency}) = \frac{V_{OUT} * I_{OUT}}{V_{IN} * I_{OUT} + P_{D_{Total(Leakage)}}} \quad (1)$$

Examples disclosed herein provide an adaptive approach to reduce leakage current (e.g. to increase efficiency) of such transistors, as well as the power converters deploying these transistors (e.g. buck converters, boost converters, AC-AC converters, DC-DC converters, AC-DC converters, etc.). The leakage current is influencing the total power dissipation of the power converter and thus reducing the amount of leakage current reduces the total power dissipated by the leakage current ($P_{D_{Total(Leakage)}}$) in the above-referenced equation. When the leakage current through the transistors is reduced the power dissipated by the transistors will be reduced. Furthermore, there will be no current that flows to the output of the power converter. This will prevent any buildup of voltage at the output capacitor when the transistors are intended to be off. The resultant effect of reducing the leakage current through the transistors is that the power converter will have increased efficiency across a variety of loads.

Figure 1:
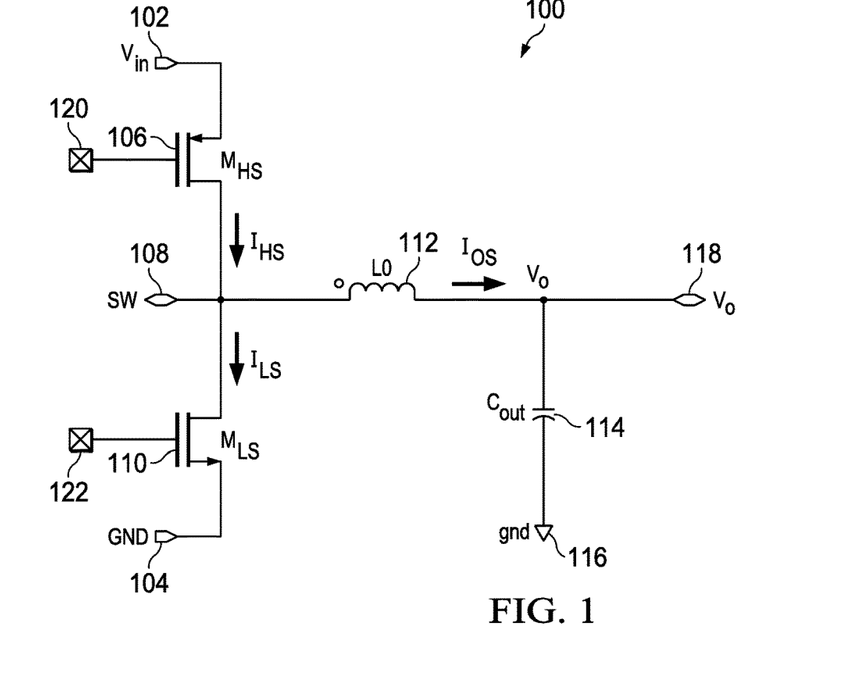
FIG. 1 is an illustration of an example buck converter.

FIG. 1 is an illustration of an example buck converter 100. The buck converter 100 has an example input voltage node $V_{in}$ 102 that is referenced to an example ground node (GND) 104. The buck converter 100 includes a high-side transistor 106 ($M_{HS}$) having a source coupled to the input voltage node $V_{in}$ 102. In the example of FIG. 1, the drain of the high-side transistor 106 is coupled to a switch node SW 108. The switch node SW 108 is coupled to the drain of a low-side transistor 110 ($M_{LS}$). The source of the low-side transistor 110 is coupled to the ground node (GND) 104. The current flowing through the high-side transistor 106 is labelled $I_{HS}$ and the current flowing through the low-side transistor 110 is labelled $I_{LS}$. The switch node SW 108 is coupled an inductor 112, which is coupled to the positive terminal of a capacitor 114. The negative terminal of the capacitor 114 is coupled to a ground node (gnd) 116. The positive terminal of the capacitor 114 is also coupled to an output voltage node $V_o$ 118, which may be a voltage supply for other circuits not shown in FIG. 1. The inductor 112, the capacitor 114, and the output voltage node $V_o$ 118 comprise an output stage of the buck converter 100. The current flowing through the output stage is labelled $I_{OS}$.

The high-side transistor 106 and the low-side transistor 110 are an example of a set of synchronous transistors (e.g. switches) in the buck converter 100. The high-side transistor 106 and the low-side transistor 110 may be controlled by control signals 120 and 122 that are applied to gates of the high-side transistor 106 and the low-side transistor 110, respectively.

DC power converters function by temporarily storing input energy in electronic components (e.g. inductors, capacitors, inductive elements, capacitive elements, etc.) and then releasing that energy at the output load at a different voltage. In the buck converter 100, when the high-side transistor 106 is on and the low-side transistor 110 is off, current ($I_{HS}$) flows from the input voltage node $V_{in}$ 102 to the inductor 112, which charges at a linear rate. When the inductor 112 is charging, it is storing energy in a magnetic field produced by the current ($I_{OS}$) flowing through it. Additionally, when the high-side transistor 106 is on and the low-side transistor 110 is off, the capacitor 114 also charges to the desired output voltage level and the load is supplied with current from the input. When the high-side transistor is off, the low-side transistor is on the current in the buck converter 100 to continue to flow to the load. The energy that is stored in the magnetic field of the inductor 112 dissipates and as it does so, generates a current that will flow through the circuit and to the load. The current ($I_{OS}$) flowing through the output stage of the buck converter 100 will be equal in magnitude to the current ($I_{LS}$) flowing though the low-side transistor 110. The current ($I_{OS}$) from the inductor 112 flows to the capacitor 114 and the load, while the capacitor 114 maintains the desired output voltage of the buck converter 100 and the load receives the power. The current returns to the inductor 112 by flowing through the ground node (gnd) 116, the ground node (GND) 104, and the low-side transistor 110. The switching pattern noted above allows for continuous current to flow into the load of the buck converter 100.

A controller may be implemented to control the high-side transistor 106 and the low-side transistor 110 such that the two transistors alternate between the high-side transistor 106 being on and the low-side transistor 110 being off and the high-side transistor 106 being off and the low-side transistor 110 being on. This may be done at frequency and duty cycle that is determined by the controller such that the output voltage of the buck converter 100 can be maintained at the desired output voltage and within a safe operating area of the buck converter 100.

Figure 2:
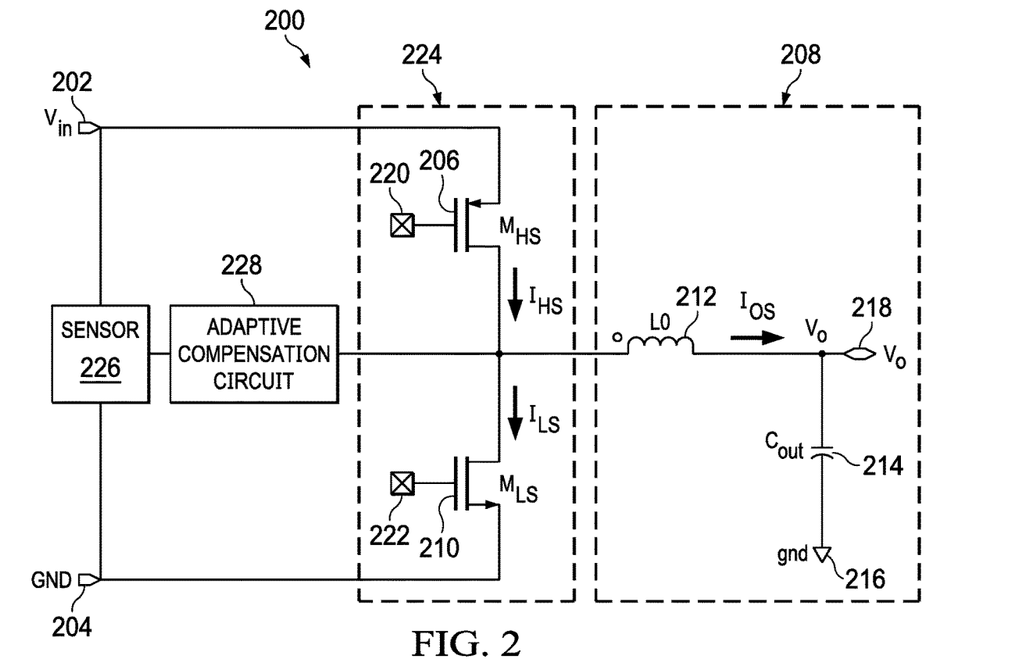
FIG. 2 is a diagram of an example power converter including a sensor and an adaptive compensation circuit.

FIG. 2 illustrates an example power converter 200 including an input voltage node $V_{in}$ 202 which is referenced to a ground node (GND) 204, an output stage 208, regulator 224, a sensor 226 and an adaptive compensation circuit 228.

In the illustrated example, the output stage 208 includes an inductor 212, a capacitor 214, a ground node (gnd) 216, and an output voltage node $V_o$ 218. The output stage 208 may include components (e.g., capacitors, inductors, inductive elements, capacitive elements, etc.) that, when driven by the regulator 224 convert the voltage at the input voltage node $V_{in}$ 202 to a desired output voltage. The output stage 208 is coupled to the regulator 224 as well as to the adaptive compensation circuit 228.

The inductor 212 is coupled to the drain of the high-side transistor 206 and the drain of the low-side transistor 210. The inductor 212 is further coupled to the positive terminal of the capacitor 214, which forms the output voltage node $V_o$ 218 that may be a voltage supply for other circuits not shown in FIG. 2. The negative terminal of the capacitor 214 is coupled to the ground node (gnd) 216.

In the illustrated example of FIG. 2, the regulator 224 is configured with the high-side transistor 206 ($M_{HS}$) and the low-side transistor 210 ($M_{LS}$) and may utilize any type of power transistor (e.g. the transistor 206 or 210, a MOSFET, an insulated-gate bipolar transistor (IGBT), etc.). The power transistor may be designed to operate quickly with low rise-time and fall-time, to be able to withstand continued high current, to be able to block current at high voltages, and to be able to operate at a variety of temperatures in which they are set. The source of the high-side transistor 206 is coupled to the input voltage node $V_{in}$ 202. The drain of the high-side transistor 206 is coupled to the drain of the low-side transistor 210. The source of the low-side transistor 210 is coupled to ground node (GND) 204. In some examples, the high-side transistor 206 and the low-side transistor 210 are toggled to allow the output current to flow toward the output stage 208 or toward the ground node (GND) 204, depending on the state of the high-side transistor 206 and the low-side transistor 210. For example, when the high-side transistor 206 is enabled and the low-side transistor 210 is disabled, the input voltage at the input voltage node $V_{in}$ 202 is shorted to the output stage 208 via the high-side transistor 206, causing the output current to flow through the high-side transistor 206 and toward the output stage 208. When the high-side transistor 206 is enabled and the low-side transistor 210 is disabled, the current ($I_{HS}$) flowing through the high-side transistor 206 is equal in magnitude to the current ($I_{OS}$) flowing through the output stage 208. When the high-side transistor 206 is disabled and the low-side transistor 210 is enabled, the current is sourced from the inductor 212. When the high-side transistor 206 is disabled and the low-side transistor 210 is enabled, the current returns to the inductor 212 by flowing through the ground node (gnd) 216, the ground node (GND) 204, and the low-side transistor 210. When the high-side transistor 206 is disabled and the low-side transistor 210 is enabled, the current ($I_{OS}$) flowing through the output stage 208 is equal in magnitude to the current ($I_{LS}$) flowing through the low-side transistor 210. Accordingly, one or more control signals 220 and 222 may be applied to the gates of the high-side transistor 206 and low-side transistor 210 to switch the flow of current to convert an input voltage at the input voltage node $V_{in}$ 202 to a desired output voltage at the output voltage node $V_o$ 218 (e.g., such as in a power converter).

In the illustrated example of FIG. 2 the sensor is coupled to the input voltage node $V_{in}$ 202, the ground node (GND) 204, the regulator 224, and the adaptive compensation circuit 228. The sensor 226 may be implemented as hardware or software. As a hardware implementation, the sensor 226 may include a sense field effect transistor (FET), a shunt resistor, a current transducer, fiber optic sensor, a fluxgate transformer, etc. For a hardware implementation, an amplifier may be used to convert the output of one of the above sensors into a control signal for other portions of the power converter 200. As a software implementation a microcontroller may take in a signal from the high-side transistor 206 or the low-side transistor 210 to be monitored and then based on that signal generate an output to communicate with another portion of the power converter 200. The sensor 226 allows for the current ($I_{HS}$) flowing through the high-side transistor 206 and the current ($I_{LS}$) flowing through the low-side transistor 210 to be detected when the transistors are off. This allows for other portions of the power converter 200 to determine if compensation of the leakage current is required. If it is determined from the currents sensed by the sensor 226 that compensation is required, the adaptive compensation circuit 228 will apply compensation (e.g. make an adjustment) to the output stage 208.

In the illustrated example, the adaptive compensation circuit 228 is coupled to the sensor 226 as well as the output stage 208. The adaptive compensation circuit 228 may be implemented as hardware or software. As a hardware implementation, the adaptive compensation circuit 228 may be a current mirror, a Zener diode current source, a transistor current source with diode compensation, etc. As a software implementation, the adaptive compensation circuit 228 may take in a signal from the sensor 226 and based on that signal, generate another signal to compensate the current through the output stage 208. The adaptive compensation circuit 228 allows for the difference in the leakage current ($I_{HS}$) flowing through the high-side transistor 206 and the leakage current ($I_{LS}$) flowing through the low-side transistor 210 to be removed, or subtracted, from the output stage 208. This is done after the determination that the compensation of the leakage current is required. When the high-side transistor 206 and the low-side transistor 210 are off, the difference in the leakage current $I_{HS}$ and the leakage current $I_{LS}$ is the current ($I_{OS}$) flowing through the output stage 208.

Figure 3:
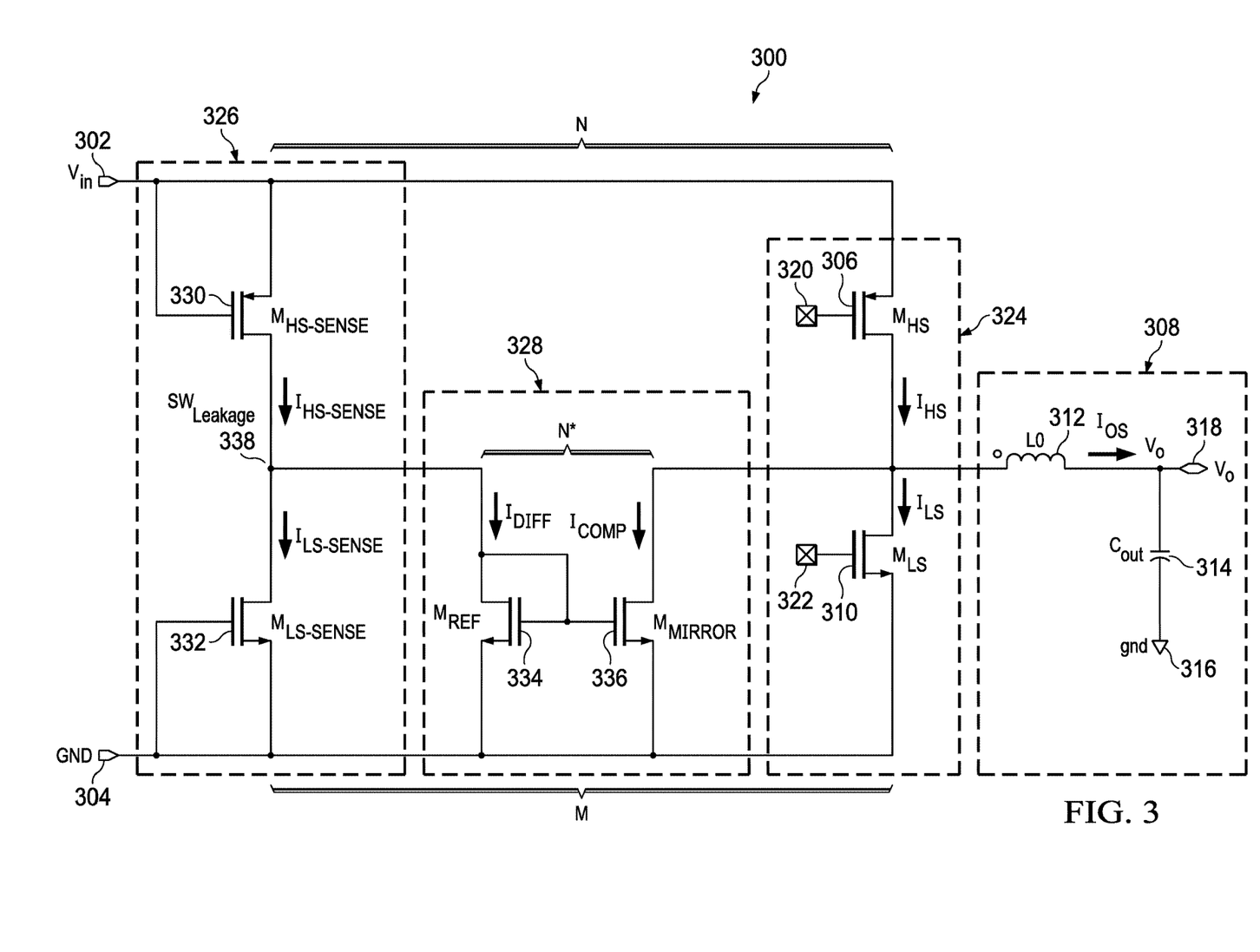
FIG. 3 is an illustration of an example circuit implementation of the sensor and the adaptive compensation circuit of FIG. 2.

FIG. 3 is an illustration of an example hardware implementation of the power converter 200 as shown in the block diagram in FIG. 2. The power converter 300 includes an input voltage node $V_{in}$ 302 which is referenced to a ground node (GND) 304, an output stage 308, a regulator 324, a sensor 326, and an adaptive compensation circuit 328. The output stage 208 of FIG. 2 is represented as the output stage 308. The regulator 224 of FIG. 2 is represented as the regulator 324. The sensor 226 of FIG. 2 is represented in hardware as the sensor 326. The adaptive compensation circuit 228 of FIG. 2 is represented in hardware as the adaptive compensation circuit 328.

In the illustrated example of FIG. 3, the regulator 324 regulates the flow of current ($I_{OS}$) through the output stage 308. The regulator 324 may regulate the power converter 300 such that the input voltage at the input voltage node $V_1$ 302 is shorted to the output stage 308, thus allowing current to flow from the input voltage node $V_{in}$ 302 to the output stage 308. When the current flows from the input voltage node $V_{in}$ 302 and the output stage 308, the current ($I_{HS}$) flowing through the high-side transistor 306 ($M_{HS}$) is equal in magnitude to the current ($I_{OS}$) flowing through the output stage 308. Alternatively, the regulator 324 may regulate the power converter 300 such that the current flows between the regulator 324 and the output stage 308. When the current flows between the regulator 324 and the output stage 308, the current ($I_{OS}$) flowing through the output stage is equal in magnitude to the current ($I_{LS}$) flowing through the low-side transistor 310 ($M_{HS}$). When the control signals 320 and 322 are configured such that the high side transistor 306 and the low side transistor 310 are off, leakage current $I_{HS}$ and leakage current $I_{LS}$ may flow through the regulator 324 and to the output stage 308. This leakage current may be sensed by the sensor 326 and then mirrored to the adaptive compensation circuit 328. The current mirrored to the adaptive compensation circuit 328 is then used to deduct the leakage current ($I_{OS}$) from the output stage 308 so that the negative effects of the leakage current (e.g. power loss, malfunctions, etc.) may be negated.

In the illustrated example, the output stage 308 includes an inductor 312, a capacitor 314, a ground node (gnd) 316, and an output voltage node $V_o$ 318. The output stage 308 may include components (e.g., capacitors, inductors, inductive elements, capacitive elements, etc.) that, when driven by the regulator 324 convert the input voltage at the input voltage node $V_{in}$ 302 to a desired output voltage. The output stage 308 is coupled to the regulator 324 as well as to the adaptive compensation circuit 328.

The inductor 312 is coupled to the drain of the high-side transistor 306 and the drain of the low-side transistor 310. The inductor 312 is further coupled to the positive terminal of the capacitor 314, which forms the output voltage node $V_o$ 318 that may be a voltage supply for other circuits not shown in FIG. 3. The negative terminal of the capacitor 314 is coupled to the ground node (gnd) 316.

In the illustrated example of FIG. 3, the regulator 324 is configured with the high-side transistor 306 and the low-side transistor 310 and may utilize any type of power transistor (e.g. the transistor 306 or 310, a MOSFET, an insulated-gate bipolar transistor (IGBT), etc.). The power transistor may be designed to operate quickly with low rise-time and fall-time, to be able to withstand continued high current, to be able to block current at high voltages, and to be able to operate at a variety of temperatures in which they are set. The source of the high-side transistor 306 is coupled to the input voltage node $V_{in}$ 302. The drain of the high-side transistor 306 is coupled to the drain of the low-side transistor 310. The high-side PMOS transistor 306 and the low-side NMOS transistor 310 form a first current path. The source of the low-side transistor 310 is coupled to ground node (GND) 304. In some examples, the high-side transistor 306 and the low-side transistor 310 are toggled to allow the output current to flow toward the output stage 308 or toward ground node (GND) 304, depending on the state of the high-side transistor 306 and the low-side transistor 310. For example, when the high-side transistor 306 is enabled and the low-side transistor 310 is disabled, the input voltage at the input voltage node $V_{in}$ 302 is shorted to the output stage 308 via the high-side transistor 306, causing the output current to flow toward the output stage 308. When the high-side transistor 306 is disabled and the low-side transistor 310 is enabled, the output current flows out to the ground node (gnd) 316 via the low-side transistor 310. Accordingly, one or more control signals 320 and 322 may be applied to the gates of the high-side transistor 306 and low-side transistor 310 to switch the flow of current to convert an input voltage at the input voltage node $V_{in}$ 302 to a desired output voltage at the output voltage node $V_o$ 318 (e.g., such as in a power converter).

In the illustrated example of FIG. 3, the sensor 326 is coupled to the regulator 324, the adaptive compensation circuit 328, the input voltage node $V_{in}$ 302, and the ground node (GND) 304. The sensor 326 uses sense MOSFETs to sense the leakage current ($I_{HS}$) flowing through the high-side transistor 306 and the leakage current ($I_{LS}$) flowing through the low-side transistor 310 in the regulator 324. The high-side transistor 306 is a PMOS transistor. The low-side transistor 310 is an NMOS transistor. The high-side PMOS transistor 306 is coupled to the high-side sense transistor 330 ($M_{HS-SENSE}$). The high-side sense transistor 330 is a PMOS transistor. The coupling between the high-side PMOS transistor 306 and the high-side sense PMOS transistor 330 is an example of PMOS sensing. PMOS sensing may be performed base on a proportional relationship (N) (i.e. a ratio) between the leakage current ($I_{HS}$) flowing through the high-side PMOS transistor 306 and the sensed current ($I_{HS-SENSE}$) flowing through the high-side sense PMOS transistor 330. The ratio (N) may be based on the channel width of the PMOS transistor used for the high-side PMOS transistor 306 and the channel width of the PMOS transistor used for the high-side sense PMOS transistor 330, such that the ratio $N=M_{HS}/M_{HS-SENSE}$. The low-side NMOS transistor 310 is coupled to the low-side sense transistor 332 ($M_{LS-SENSE}$). The low-side sense transistor 332 is an NMOS transistor. The coupling between the low-side NMOS transistor 310 and the low-side sense NMOS transistor 332 is an example of NMOS sensing. NMOS sensing may be performed based on a proportional relationship (M) (i.e. a ratio) between the leakage current ($I_{LS}$) flowing through the low-side NMOS transistor 310 and the sensed current ($I_{LS-SENSE}$) flowing through the low-side sense NMOS transistor 332. The ratio M may be based on the channel width of the NMOS transistor used for the low-side NMOS transistor 310 and the channel width of the NMOS transistor used for the low-side sense NMOS transistor 332, such that the ratio $M=M_{LS}/M_{LS-SENSE}$. The high-side sense transistor 330 and the low-side sense transistor 332 form a second current path. The drain of the high-side sense PMOS transistor 330 and the drain of the low-side sense NMOS transistor 332 are coupled together at the node $SW_{Leakage}$ 338. The difference between the sensed current $I_{HS-SENSE}$ through the high-side sense PMOS transistor 330 and the sensed current $I_{LS-SENSE}$ through the low-side sense NMOS transistor 332 flows to the adaptive compensation circuit 328 through the node $SW_{Leakage}$ 338. This difference is proportionally related to the leakage current that will flow to the output stage 308. Alternatively, the above sensing techniques (e.g. PMOS sensing, NMOS sensing) are not limited to PMOS transistor and NMOS transistors but may be implemented with any type of transistor (e.g. PMOS transistor, NMOS transistor, BJT, IGBT, JFET, etc.).

In the illustrated example of FIG. 3, the adaptive compensation circuit 328 is coupled to the sensor 326 at the node $SW_{Leakage}$ 338. The adaptive compensation circuit 328 is also coupled to the output stage 308 at the connection between the drain of the high-side PMOS transistor 306, the drain of low-side NMOS transistor 310, and the inductor 312. Alternatively, the adaptive compensation circuit 328 may be coupled to the output stage 308 of the power converter 300 at the positive terminal of the capacitor 314. The adaptive compensation circuit 328 receives the difference current ($I_{DIFF}$) from the sensor 326 via the node SW Leakage Leakage 338. The adaptive compensation circuit 328 is set up in a current mirroring configuration, such that the reference MOSFET 334 ($M_{REF}$) and the mirror MOSFET 336 ($M_{Mirror}$) form a current mirror. The reference MOSFET 334 receives the difference current ($I_{DIFF}$). The reference MOSFET 334 is coupled to the mirror MOSFET 336 at the gate of the reference MOSFET 334 and the gate of the mirror MOSFET 336. The adaptive compensation circuit 328 generates a compensating current ($I_{COMP}$) that flows from the output stage 308 to the mirror MOSFET 336. The difference current ($I_{DIFF}$) is proportional, based on a ratio (N*), to the compensation current ($I_{COMP}$) such that the ratio N*=$M_{Mirror}/M_{REF}$. The target ratio N* is designed such that the compensation current ($I_{COMP}$) is the exact leakage current ($I_{OS}$) that is flowing to the output stage 308. Because of this, the total leakage current ($I_{OS}$) is removed from the output stage 308. To ensure that this compensation current ($I_{COMP}$) is the same as the leakage current ($I_{OS}$) flowing to the output stage 308, the ratio between the sense MOSFETs and the high-side PMOS and low-side NMOS MOSFETs, as well as the ratio between the reference MOSFET 334 and the mirror MOSFET 336 must be as follows: N*≥N≥M.

In the illustrated example of FIG. 3, the high-side PMOS transistor 306 and the low-side NMOS transistor 310 may control the flow of current to the output stage 308. The high-side PMOS transistor 306 may be controlled by the control signal 320 being applied to the gate of the high-side PMOS transistor 306. Furthermore, the low-side NMOS transistor 310 may be controlled by the control signal 322 being applied to the gate of the low-side NMOS transistor 310. When the high-side PMOS transistor 306 is on and the low-side NMOS transistor 310 is off, current flows from the input voltage node $V_{in}$ 302 to the output stage 308. When the high-side PMOS transistor 306 is on and the low-side NMOS transistor 310 is off, the current ($I_{HS}$) flowing through the high-side PMOS transistor 306 is equal in magnitude to the current ($I_{OS}$) flowing through the output stage 308. In this case, the current charges the inductor 312 and the capacitor 314 such that energy is stored in the inductor 312 in the form of a magnetic field and energy is stored in the capacitor 314 in the form of an electric field. When the high-side PMOS transistor 306 is off and the low-side NMOS transistor 310 is on, current flows between the low-side NMOS transistor 310 and the output stage 308. When the high-side PMOS transistor 306 is off and the low-side NMOS transistor 310 is on, the current ($I_{OS}$) flowing through the output stage 308 is equal in magnitude to the current ($I_{LS}$) flowing through the low-side NMOS transistor 310. In this case, the energy stored in the magnetic field of the inductor 312 dissipates to produce the current flowing and the energy stored in the electric field of the capacitor 314 is used to maintain the voltage on the output voltage node $V_o$ 318. A controller may be implemented to control the high-side transistor 306 and the low-side transistor 310 such that the two transistors alternate between the high-side transistor 306 being on and the low-side transistor 310 being off and the high-side transistor 306 being off and the low-side transistor 310 being on. This may be done at frequency and duty cycle that is determined by the controller such that the output voltage at the output voltage node $V_o$ can be maintained at the desired output voltage and within a safe operating area of the power converter 300. When the high-side PMOS transistor 306 is off and the low-side NMOS transistor 310 is off, leakage current may flow from the input voltage $V_{in}$ 302 to the output stage 308 of the power converter 300. In this case, the high-side sense PMOS transistor 330 will sense the leakage current ($I_{HS}$) flowing through the high-side PMOS transistor 306 and the low-side sense NMOS transistor 332 will sense the leakage current ($I_{LS}$) flowing through the low-side NMOS transistor 310. The difference current ($I_{DIFF}$) between the sensed current $I_{HS\text{-}SENSE}$ and the sensed current $I_{LS}$-SENSE will flow to the adaptive compensation network 328 as will the difference between the leakage current $I_{HS}$ and the leakage current $I_{LS}$ flow to the output stage 308. When the high-side PMOS transistor 306 and the low-side NMOS transistor 310 are off, the difference in the leakage current $I_{HS}$ and the leakage current $I_{LS}$ is the current ($I_{OS}$) flowing through the output stage 308. The reference MOSFET 334 may receive the difference current as an input to the adaptive compensation circuit 328. The difference current ($I_{DIFF}$) is then mirrored across the adaptive compensation circuit 328 from the reference MOSFET 334 to the mirror MOSFET 336. The mirror MOSFET 336 generates the compensation current ($I_{COMP}$) which is then deducted from the output stage 308, negating the effects of the leakage current ($I_{OS}$).

The sensor 326 and the adaptive compensation circuit 328 are active regardless of whether or not the high-side PMOS transistor 306 and the low-side NMOS transistor 310 are conducting. When the high-side PMOS transistor 306 and the low-side NMOS transistor 310 are in the off state, the compensating current ($I_{COMP}$) is a value such that the leakage current ($I_{OS}$) flowing to the output stage 308 is completely compensated and there is no resultant charge up of the output voltage at the output voltage node $V_o$ 318. However, when the high-side PMOS transistor 306 and the low-side NMOS transistor 310 are being used as a set of synchronous transistors, the compensating current ($I_{COMP}$) is neglectable and therefore the power converter 300 operates as expected.

Figure 4:
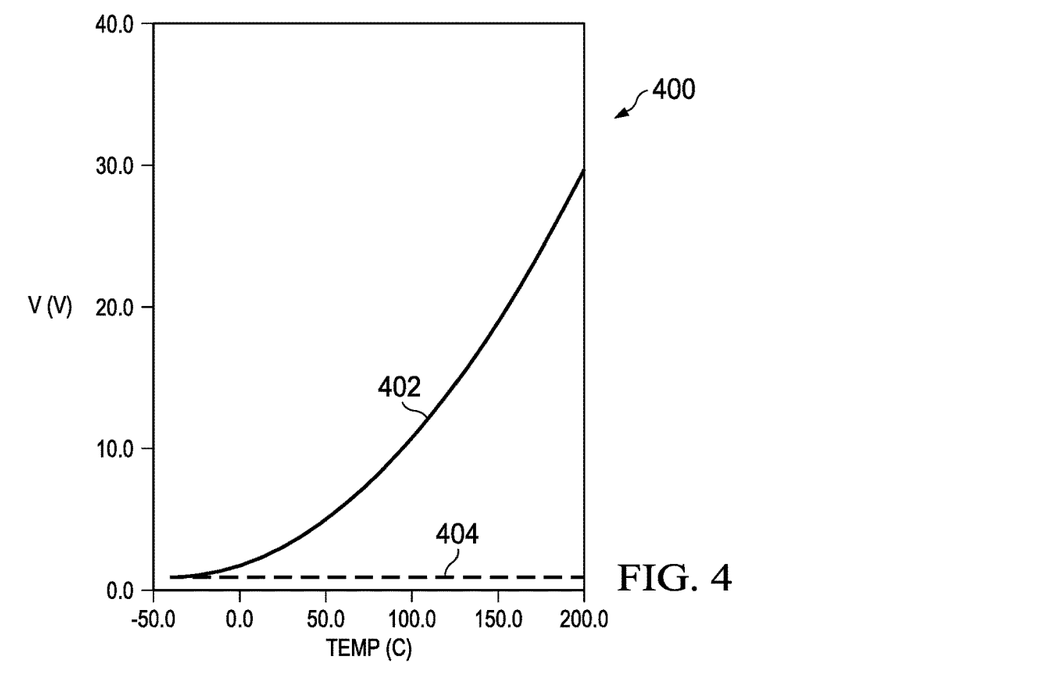
FIG. 4 is a graph showing output voltage with and without adaptive compensation versus ambient temperature for the circuits of FIGS. 2 and 3.

FIG. 4 is an example graph 400 of the output voltage of the buck converter 100 of FIG. 1 versus the ambient temperature. The graph 400 contains two plots: output voltage without leakage current compensation 402, and target output voltage with leakage current compensation 404. Both of these plots 402, 404 are set against the ambient temperature of the buck converter 100. The ambient temperature ranges from −50° C. to 200° C. The output voltage without leakage current compensation 402 ranges from approximately 0 VDC to almost 30 VDC as the ambient temperature rises. This is due to the leakage current flowing to the output stage of the buck converter 100. Without the adaptive compensation circuit 228, the voltage that is being maintained by the capacitor 114 in the output stage will rise without bound and will cause power loss and potentially damages to the buck converter 100 or the application in which it is used. The target output voltage with leakage current compensation 404 maintains a constant voltage of approximately 0 VDC as the ambient temperature rises. This is due to the advent of the adaptive compensation circuit 228. This allows for the leakage current to be withdrawn from the output stage of the buck converter 100 regardless of the ambient temperature. This conserves power as well as prevents potential damages to the buck converter 100 or the application in which it is used. Furthermore, only the excess leakage current is compensated. This allows for the output voltage to be kept within regulation with low output current to a connected load. Additionally, with the advent of the adaptive compensation circuit 228, power conversion efficiency may be maximized over a wide range of loads.

Figure 5:
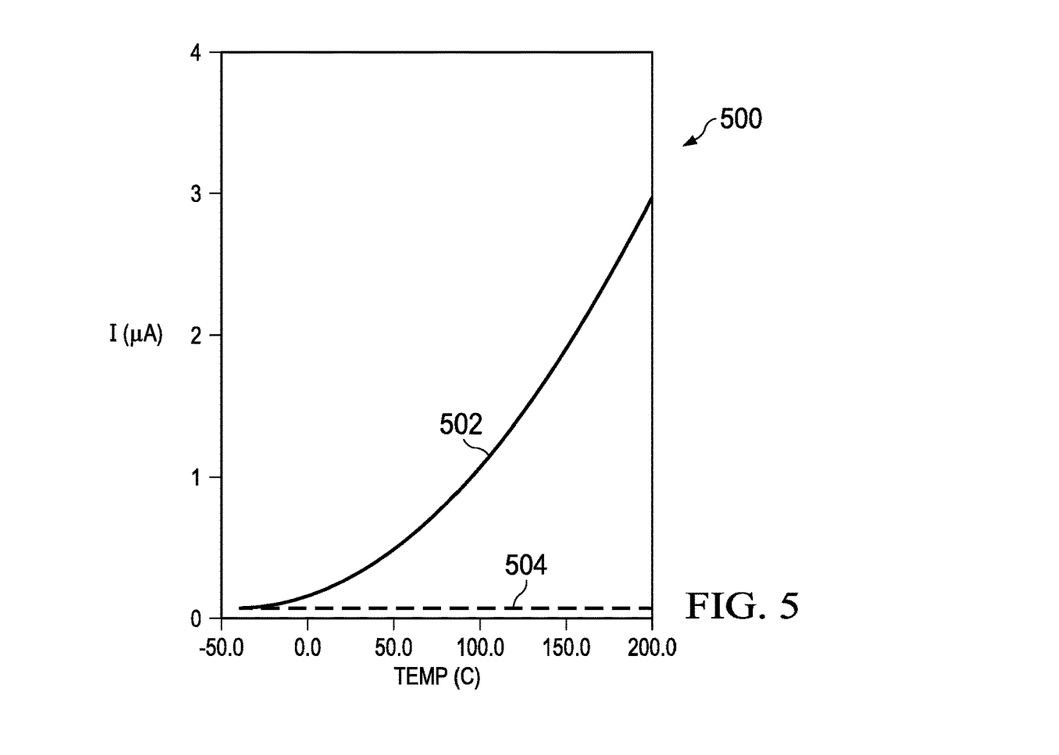
FIG. 5 is a graph showing leakage currents with and without adaptive compensation versus ambient temperature for the circuits of FIGS. 2 and 3.

FIG. 5 is an example graph 500 of the output load current of the buck converter 100 of FIG. 1 versus the ambient temperature. The graph 500 contains two plots: output load current without leakage current compensation 502 and output load current with leakage current compensation 504.

Both of these plots 502, 504 are set against the ambient temperature of the buck converter 100. The ambient temperature ranges from −50° C. to 200° C. as the ambient temperature rises. The output load current without leakage current compensation 502 ranges from approximately 0 µA to almost 3 µA. This is due to the leakage current flowing to the output stage of the buck converter 100. Without the adaptive compensation circuit 228, the leakage current flowing through the high-side PMOS transistor 106 and the low-side NMOS transistor 110 will increase without bound and will cause power loss and potentially damages to the buck converter 100 or the application in which it is used. The output load current with leakage current compensation 504 maintains a constant current of approximately 0 µA. This is due to the advent of the adaptive compensation circuit 228. This allows for the leakage current to be withdrawn from the output stage of the buck converter 100 regardless of the ambient temperature. This conserves power as well as prevents potential damages to the buck converter 100 or the application in which it is used. Furthermore, only the excess leakage current is compensated. This allows for the output voltage of the buck converter to be kept within regulation with low output current to a connected load. Additionally, with the advent of the adaptive compensation circuit 228, power conversion efficiency may be maximized over a wide range of loads.

Figure 6:
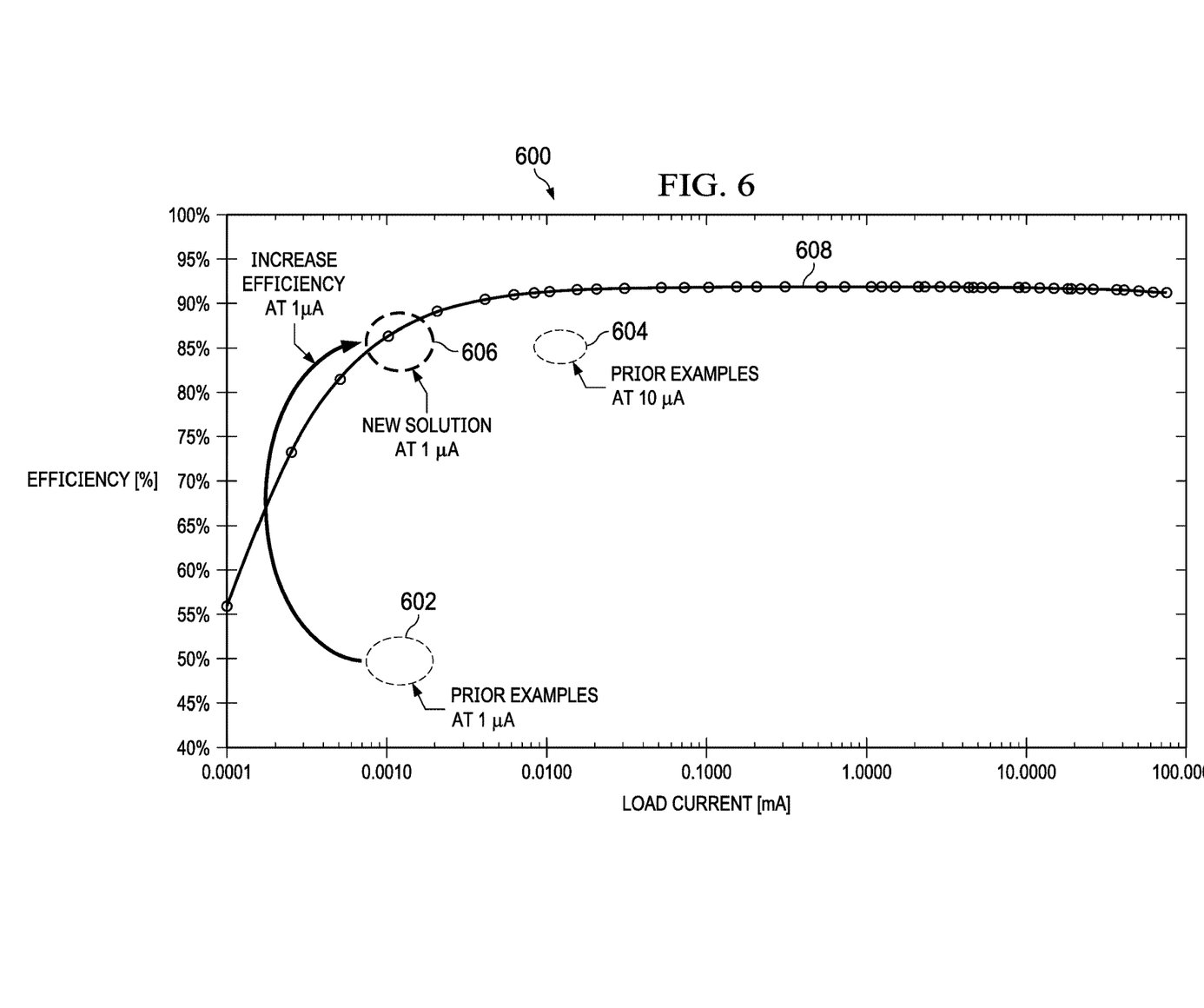
FIG. 6 is a graph showing the increased efficiency of the buck converter 100 when using the adaptive compensation circuit of FIGS. 2 and 3.

FIG. 6 is an example graph 600 of the efficiency of the buck converter 100 of FIG. 1 versus the load current. The load current is reflective of the current flowing through the load connected to the buck converter 100. The graph 600 includes a first area 602, a second area 604, a third area 606, and a curve 608. In the graph 600, the first area 602 corresponds to the efficiency of the buck converter 100 at 1 µA of load current using traditional compensation techniques. The second area 604 corresponds to the efficiency of the buck converter 100 at 10 µA of load current using traditional compensation techniques. The third area 606 corresponds to the efficiency of the buck converter 100 at 1 µA of load current using the adaptive compensation circuit of FIG. 2. The efficiency at the first area 602 is about 50% while the efficiency at the second area 604 is roughly 85%. The third area 606 has an efficiency of about 85%. The increased efficiency between the first area 602 and the third area 606 seen on the graph is due to the use of the adaptive compensation circuit of FIG. 2. The curve 608 corresponds to the efficiency curve of the buck converter 100 when the adaptive compensation circuit of FIG. 2 is used. This allows for increased efficiency over a wide range of load values.

While an example manner of implementing the adaptive compensation circuit of FIG. 2 is illustrated in FIG. 3, one or more of the elements, processes and/or devices illustrated in FIG. 3 may be combined, divided, re-arranged, omitted, eliminated and/or implemented in any other way. Further, the example sensor 226 and the example adaptive compensation circuit 228 of FIG. 2 may be implemented by hardware, software, firmware and/or any combination of hardware, software and/or firmware. Thus, for example, any of the example sensor 226 and the example adaptive compensation circuit 228 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor 226 and the example adaptive compensation circuit 228 is/are hereby expressly defined to include a non-transitory computer readable storage device or storage disk such as a memory, a digital versatile disk (DVD), a compact disk (CD), a Blu-ray disk, etc. including the software and/or firmware. Further still, the example sensor 226 and the example adaptive compensation circuit 228 of FIG. 2 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
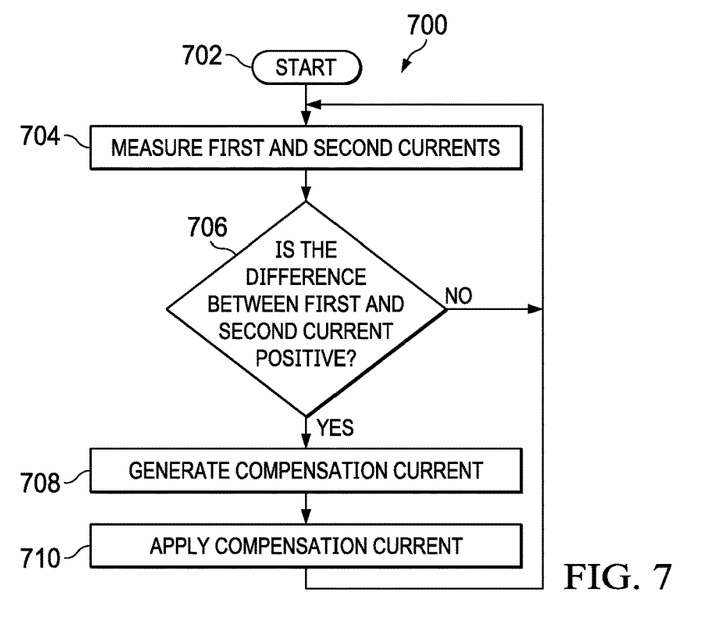
FIG. 7 is a flowchart representative of machine readable instructions that may be executed to implement the adaptive compensation circuit of FIG. 2.

A flowchart representative of example hardware logic, machine readable instructions, hardware implemented state machines, and/or any combination thereof for implementing the sensor 226 and the adaptive compensation circuit 228 of FIG. 2 is shown in FIG. 7. The machine readable instructions may be an executable program or portion of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example sensor 226 and the example adaptive compensation circuit 228 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one of A and at least one of B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least A, (2) at least B, and (3) at least A and at least B. Similarly, as used herein in the context of describing the performance or execution of processes, instructions, actions, activities and/or steps, the phrase "at least one of A or B" is intended to refer to implementations including any of (1) at least A, (2) at least B, and (3) at least A and at least B.

The program of FIG. 7 shows the process 700 to carry out the sensor 226 and the adaptive compensation circuit 228 of FIG. 2. The process 700 includes block 702 which is the start of the process 700. The process 700 includes block 704 which is the block that may instruct a processor to measure a first current and a second current. The first current may be associated with the high-side PMOS transistor 206 and the second current may be associated with a low-side NMOS transistor 210. The sensor 326 is shown as an example hardware implementation of block 704. In the example hardware implementation, the high-side sense PMOS transistor 330 senses the first current and the low-side sense NMOS transistor 332 senses the second current.

The next block in the process 700 is the block 706 which is a block that may instruct a processor to determine if the difference between the first current and the second current is positive. If the processor finds that the current is not positive, the process 700 returns to block 704. If the processor determines that the difference is positive, then the process 700 passes to the block 708. Alternatively, the block 706 may be implemented as hardware as opposed to software. As hardware, the block 706 may be implemented as the coupling between the sensor 326 and the adaptive compensation circuit 328. This coupling will only allow for compensation when the difference current is positive.

The next block in the process 700 is block 708 which is the block that may instruct a processor to generate a compensation current. The next block in the process 700 is block 710 which is the block that may instruct a processor to apply the generated compensation current from block 708 to the output stage 308 shown in FIG. 3. Alternatively, the block 708 and block 710 may be implemented as hardware. As a hardware implementation, the block 708 may be implemented as the adaptive compensation circuit 328 which generates the compensation current. Additionally, block 710 may be implemented as the coupling between the adaptive compensation circuit 328 and the output stage 308. This coupling may allow for the adaptive compensation circuit 328 to apply the compensation current to the output stage 308.

Figure 8:
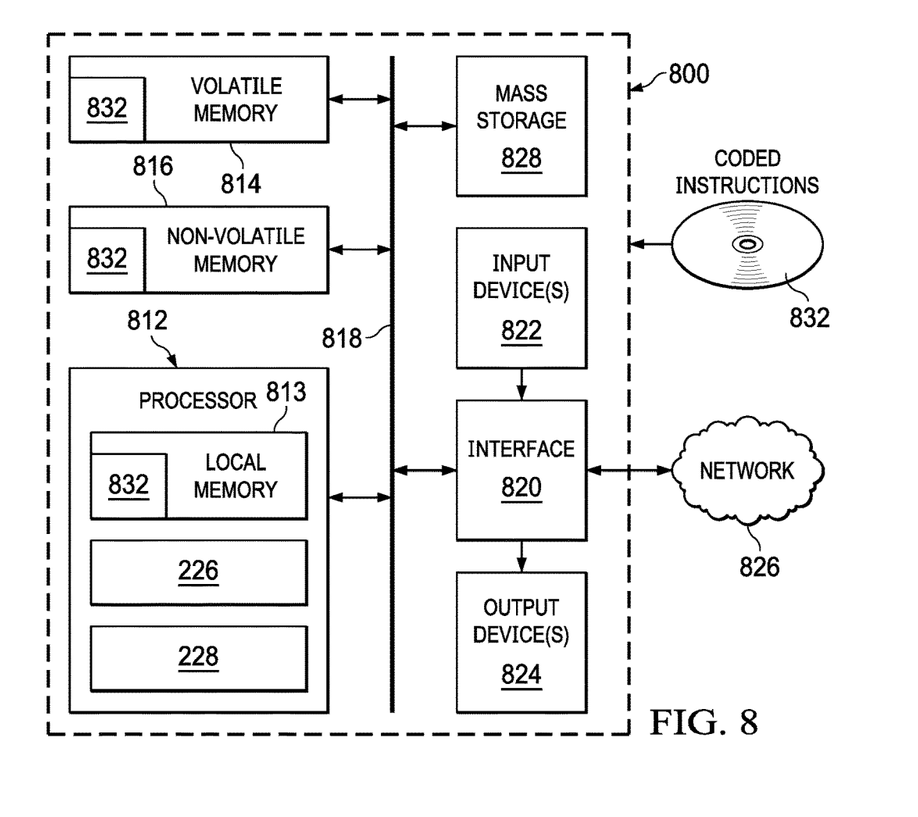
FIG. 8 is a block diagram of an example processor platform that may execute the example instructions of FIG. 7 to implement the adaptive compensation circuit of FIGS. 2 and 3.

FIG. 8 is a block diagram of an example processor platform 800 structured to execute the instructions of FIG. 7 to implement the sensor 226 and the adaptive compensation circuit 228 of FIG. 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the sensor 226 and the adaptive compensation circuit 228.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 6 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that allow for a power converter in a low quiescent current application to have increased efficiency. The adaptive compensation circuit 328 allows for the leakage current that flows to the output stage 308 of the power converter 300 to be completely compensated. Previous compensations did not fully compensate for the leakage current to the output stage 308 and used a worst-case-scenario compensation current that negatively impacted the efficiency of the power converter. Furthermore, previous compensations did not fully compensate the leakage current through the output stage 308 because the previous compensation would mirror the leakage current directly from the sensing apparatus to output voltage. As a complete solution, the adaptive compensation circuit 328 completely compensate the leakage current through the output stage 308. This provides a complete solution for keeping the output voltage of a power converter within the expected values and maintaining low output current to connected loads, thus increasing the efficiency of a power converter in a low quiescent current application. The advent of the adaptive compensation circuit 328 allows for increased power conversion efficiency over a wide range of loads. The disclosed methods, apparatus and articles of manufacture improve the efficiency of using a computing device by adaptively removing the leakage current from the output stage of a power converter. This increases the efficiency of the power converter that the invention is implemented within as well as the overall application itself. Only the leakage current is removed from the output stage in the idle state of the power converter. The disclosed methods, apparatus and articles of manufacture are accordingly directed to one or more improvement(s) in the functioning of a computer.

It is noted that this patent claims priority from U.S. Patent Application Ser. No. 62/632,255, which was filed on Feb. 19, 2018, and is hereby incorporated by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a regulator having a high-side (HS) switch and a low-side (LS) switch;
    a sensor configured to generate a sense signal representing a difference between a first current leaked by the HS switch and a second current leaked by the LS switch, the sensor configured to sense the current leaked by the HS switch at a first ratio and to sense the current leaked by the LS switch at a second ratio that is less than the first ratio; and
    a compensation circuit coupled to a switch node between the HS switch and the LS switch, the compensation circuit configured to conduct a third current via the switch node based on the sense signal, the compensation circuit configured to conduct the third current at a third ratio with respect to the sensed signal, the third ratio greater than the first ratio.

2. The apparatus of claim 1, wherein the sensor includes a HS sense transistor configured to sense the first current leaked by the HS switch, and a LS sense transistor configured to sense the second current leaked by the LS switch.

3. The apparatus of claim 2, wherein the HS sense transistor has a first ratio over the HS switch, the LS sense transistor has a second ratio over the LS switch, and the first ratio is greater than the second ratio.

4. The apparatus of claim 2, wherein the HS sense transistor is coupled to the LS sense transistor at a switch leakage node, and the sense signal is a current signal originated from the switch leakage node.

5. The apparatus of claim 2, wherein the HS sense transistor includes a source terminal coupled to a voltage input terminal of the regulator, and a gate terminal coupled to the source terminal.

6. The apparatus of claim 2, wherein the LS sense transistor includes a source terminal coupled to a ground terminal of the regulator, and a gate terminal coupled to the source terminal.

7. The apparatus of claim 1, wherein the compensation circuit includes a current mirror having a current input coupled to receive the sense signal and a current output configured to deliver the third current.

8. The apparatus of claim 1, wherein the compensation circuit is configured to conduct the third current to compensate fora combination of the first current and the second current at a voltage output terminal of the regulator.

9. The apparatus of claim 1, wherein the HS switch is turned off when the first current is leaked, and the LS switch is turned off when the second current is leaked.

10. An apparatus comprising:
    a regulator having a high-side (HS) switch and a low-side (LS) switch;
    a sensor configured to generate a first sense signal amplifying a first current, leaked by the HS switch, by a first factor, and configured to generate a second sense signal amplifying a second current, leaked by the LS switch, by a second factor less than the first factor; and
    a compensation circuit coupled to receive a difference between the first sense signal and the second sense signal, and configured to generate a compensation current based on the difference, the compensation current configured to compensate a net of the first current and the second current.

11. The apparatus of claim 10, wherein the compensation current is scaled down from the difference by a third factor greater than the first factor.

12. The apparatus of claim 10, wherein the sensor includes:
    a HS sense transistor configured to generate the first sense signal including a first sense current, the HS sense transistor has a first transistor ratio over the HS switch;
    a LS sense transistor configured to generate the second sense signal including a second sense current, the LS sense transistor has a second transistor ratio over the LS switch, the second transistor ratio less than the first transistor ratio.

13. The apparatus of claim 12, wherein the difference includes a current difference between the first sense current and the second sense current.

14. The apparatus of claim 12, wherein the HS sense transistor includes a source terminal coupled to a voltage input terminal of the regulator, and a gate terminal coupled to the source terminal.

15. The apparatus of claim 12, wherein the LS sense transistor includes a source terminal coupled to a ground terminal of the regulator, and a gate terminal coupled to the source terminal.

16. The apparatus of claim 10, wherein the HS switch is turned off when the first current is leaked, and the LS switch is turned off when the second current is leaked.

17. A power supply system comprising:
a voltage input terminal and a voltage output terminal;
a high-side (HS) switch coupled between the voltage input terminal and a switch node;
a low-side (LS) switch coupled between the switch node and a ground terminal;
a sensor configured to generate a first sense signal amplifying a first current, leaked by the HS switch, by a first factor, and configured to generate a second sense signal amplifying a second current, leaked by the LS switch, by a second factor less than the first factor; and
a compensation circuit coupled to receive a difference between the first sense signal and the second sense signal, and configured to generate a compensation current based on the difference, the compensation current configured to compensate a net of the first current and the second current at the switch node.

18. The power supply system of claim 17, wherein the compensation current is scaled down from the difference by a third factor greater than the first factor.

19. The power supply system of claim 17, further comprising:
an inductor having a first terminal coupled to the switch node, and a second terminal coupled to the voltage output terminal; and
a capacitor having a first terminal coupled to the voltage output terminal, and a second terminal coupled to the ground terminal.

* * * * *